May 19, 1970
P. BIARNAIS ET AL 3,513,078
PROCESS FOR PURIFICATION OF HIGH BOILING ESTERS FOR REMOVAL OF ALCOHOLS BY PLURAL STAGE DISTILLATION WITH STEAM OR INERT GAS
Filed Jan. 24, 1968
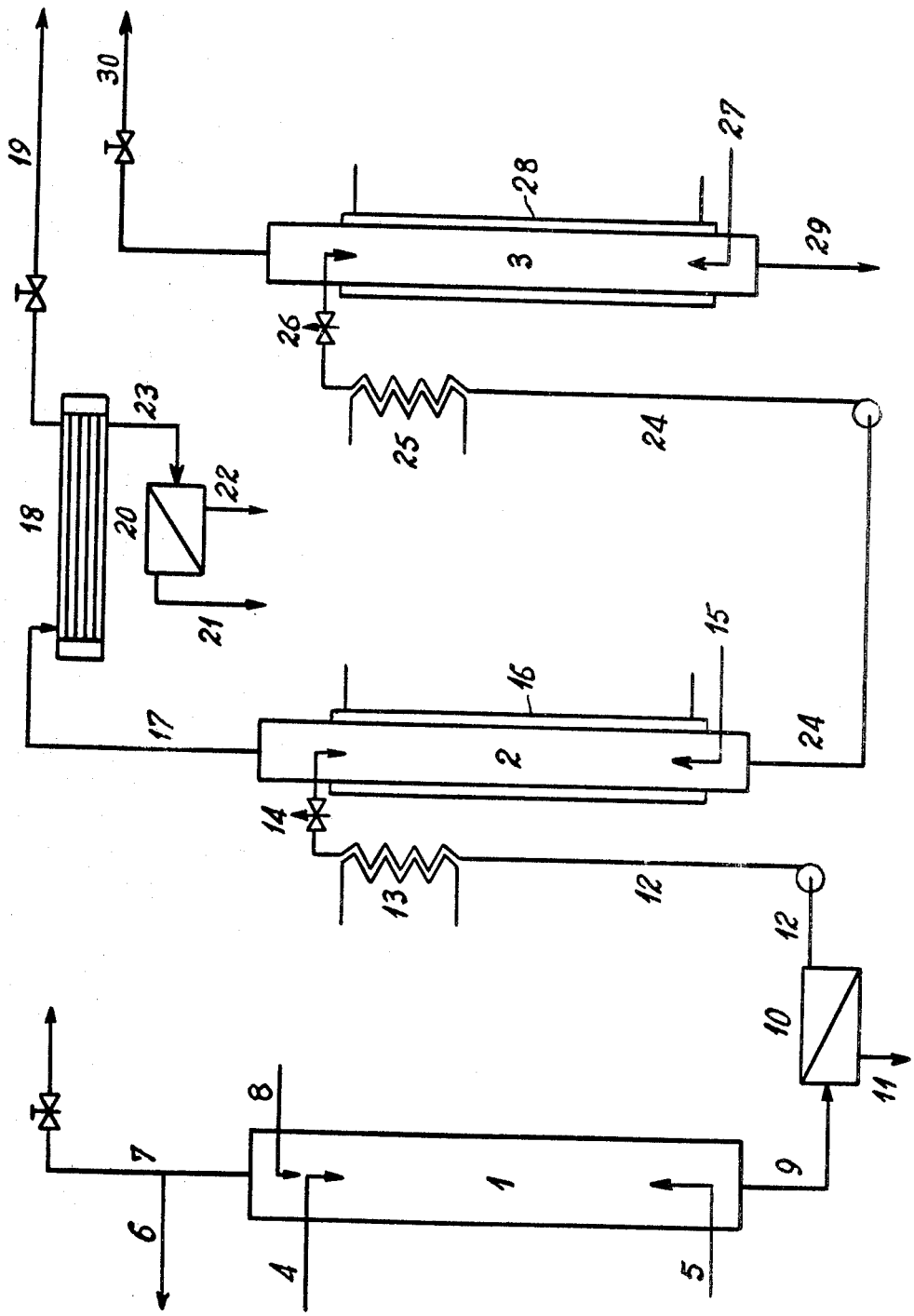
INVENTORS
PAUL BIARNAIS & GILBERT SITAUD
BY
McDougall, Hersh, Scott & Ladd
ATTYS.

United States Patent Office 3,513,078
Patented May 19, 1970

3,513,078
PROCESS FOR PURIFICATION OF HIGH BOILING ESTERS FOR REMOVAL OF ALCOHOLS BY PLURAL STAGE DISTILLATION WITH STEAM OR INERT GAS
Paul Biarnais and Gilbert Sitaud, Melle, Deux-Sevres, France, assignors to Melle-Bezons, Melle, Deux-Sevres, France
Filed Jan. 24, 1968, Ser. No. 703,843
Claims priority, application France, Feb. 9, 1967, 94,293
Int. Cl. B01d *3/38;* C07c *67/06*
U.S. Cl. 203—49                    14 Claims

ABSTRACT OF THE DISCLOSURE

The invention comprises the purification of high boiling esters which are produced by esterification of an acid or its anhydride with an excess of alcohol having at least 4 carbon atoms in which the reaction product is neutralized and water washed to produce the raw ester and in which purification of the raw ester is achieved by subjecting the raw esters to a series of successive stripping steps including the combination of a first stripping step with steam at a pressure within the range of 0.5 to 8 kg./cm.$^2$, a second stripping step with steam or inert gas at a vacuum within the range of 30 to 300 mm. of mercury, and a third stripping step with steam or an inert gas at a vacuum within the range of 2 to 20 mm. of mercury and combinations of such stripping steps which include the second stripping step with the first stripping step or the third stripping step or both, and which includes the first stripping step with the third stripping step.

---

This invention relates to the purification of high boiling esters, primarily those which can be utilized as plasticizers or lubricants. More particularly, the invention relates to esters derived from aromatic or aliphatic acids, especially diacids or anhydrides thereof, such for example as phthalic, adipic, sebacic or azelaic acid, and from primary or secondary alcohols of the series: aliphatic monohydric alcohols, such as butyl alcohol, decyl alcohol, or higher alcohols such as tridecyl alcohol; cycloaliphatic monohydric alcohols, such as cyclohexyl alcohol; araliphatic monohydric alcohols, such as benzyl alcohol; and heterocyclic monohydric alcohols, such as tetrahydrofurfuryl alcohol.

It is known that the preparation of such high boiling esters is usually effected through esterification of the acid or its anhydride by a molar excess of the alcohol of the order of 10% to 20%, so as to convert the acid reagent substantially completely. After the esterification, the raw ester, previously freed from the complex by-products formed because of the presence of the esterification catalyst, is neutralized, then washed with water to remove salts resulting from the neutralization. The separation of excess unconverted alcohol from the ester is usually effected by a conventional method such as distillation under vacuum or steam distillation.

Vacuum distillation is generally carried out under very high vacuum of the order of 0.05 to 1 millimeter of mercury so as to avoid excessive temperatures which might otherwise cause partial decomposition of the ester with resulting increase of its acidity, color and content of volatile substances and development of odors resulting from the cracking reaction.

Dibutyl phthalate, for example, becomes noticeably acid at temperatures of 135°–140° C. and di-2-ethyl hexyl phthalate at temperatures of about 160°–170° C. For these esters it is, therefore, necessary to carry out the distillation under a vacuum of 0.5 mm. Hg and 0.1 mm. Hg or less, respectively. In actual practice, however, it is possible to perform the distillation under somewhat less vacuum, such as about 1 mm. Hg, provided that the operation is carried out continuously in an apparatus where the ester to be treated is subjected to vaporization in the form of a thin film flowing across a heated surface such that the material is only exposed for a short time to the heated surface. This method, however, suffers from a number of inconveniences. In particular, it involves the use of multistage apparatus of large capacity which makes use of vulnerable devices such as rotors and airtight seals and expensive and delicate vacuum generators. Furthermore, condensation of alcohol vapors, recovered under vacuum, involves a number of difficulties.

Removal of the excess alcohol by stripping with steam is based upon the fact that alcohols which contain no more than 10 carbon atoms are capable of forming azeotropic mixtures with water which have minimum boiling points to permit alcohol separation at lower temperature.

However, the heat consumption necessary for practically complete separation of the excess alcohol from the ester is high, particularly when the theoretical azeotropic mixture contains lesser amount of alcohol. In British Pat. No. 934,027 or in U.S. Pat. No. 3,328,269, description is made of the use of slight pressures in the process to increase the alcohol content of the alcohol-water azeotropic mixture materially to reduce the heat expended for the separation of alcohols having from 6 to 10 carbon atoms. Moreover, practically all of the heat supplied can be recovered for use in heating other items of the esterification plant, such as the esterification apparatus and/or the apparatus for recovering and rectifying the water entrainer used in the esterification step.

Even this method of practicing the steam stripping process leaves much to be desired whether used in the case of alcohols having a high carbon content, such as alcohols having more than 10 carbon atoms, or the theoretical azeotropic mixture of alcohol and water is low in alcohol. The problem remains with respect to the expenditure of a large amount of heat or the practical impossibility of entraining the alcohol. Moreover, with this method, impurities such as ethers are not completely removed and, in all cases, after removal of the alcohol, the ester should be separated from the aqueous phase and dried.

Thus it is an object of this invention to provide a new and improved process for the treatment of high boiling esters and for the removal of excess alcohol and other volatile impurities in the described process of esterification and it is a related object to provide a new and improved process of the type described in which alcohols of high carbon content, such as $C_{12}$ to $C_{13}$ or even higher, can be effectively removed from the product of esterification. In actual practice, this process is concerned only with the treatment of esters derived from alcohols having at least 4 carbon atoms and preferably at least 6 carbon atoms. Another advantage of the process of the invention resides in its ability to be carried out at moderately elevated temperatures.

The present process is characterized by a combination of successive stripping steps by means of superheated steam and/or a heated vehicle gas, preferably in the form of a heated inert gas, under successively decreasing pressures.

These stripping steps may correspond to one of the various following combinations:

(A) First stripping step at atmospheric pressure or positive pressure with steam—second stripping step under moderate or high vacuum with steam and/or a vehicle gas.

(B) First stripping step under moderate vacuum with steam and/or a vehicle gas—second stripping step under high vacuum also with steam and/or a vehicle gas.

(C) First stripping step at atmospheric pressure or positive pressure with steam—second stripping step under moderate vacuum with steam and/or a vehicle gas—third stripping step under higher vacuum also with steam and/or a vehicle gas.

The operating characteristics in the various possible stripping steps may be described as follows.

(a) At atmospheric pressure in the conventional manner, or preferably at positive pressure in accordance with the process of the above mentioned British Pat. No. 934,027 or U.S. Pat. No. 3,328,269. This stripping step, which may be omitted, depending upon the properties of the alcohol to be removed and the results sought, consists in entraining a part, which may be almost all of the alcohol, by stripping with steam under the desired pressure. For this step, the preferred operating conditions are an effective pressure of 0.5 to 8 kg./cm.$^2$ and preferably 1 to 4 kg./cm.$^2$ and a temperature of 110°–175° C. and preferably 120°–140° C.

(b) Under moderate vacuum: entrainment of all or almost all of the alcohol and a part, which may be as much as almost all of the other relatively volatile impurities, by stripping with steam and/or a vehicle gas under the desired vacuum and at moderate temperature. For this step, the preferred operating conditions are an absolute pressure of 30 to 300 mm. Hg and preferably about 50 mm. Hg and a temperature of 80°–180° C. and preferably 120°–160° C., especially for esters derived from alcohols having 6 to 13 carbon atoms. The temperatures employed are far below the boiling points of the esters involved and are selected to be below the decomposition temperature of these esters. This stripping step is preferably carried out with a small amount of superheated steam and under a vacuum such that easy condensation of the whole of the distillate is permitted.

(c) Under high vacuum: entrainment of the water and the remainder of the relatively volatile impurities, especially to deodorize the ester, by stripping with steam and/or a vehicle gas at a moderate temperature and under high vacuum which is higher than in step (b). The preferred operating conditions are an absolute pressure of 2 to 20 mm. Hg and preferably about 5 mm. Hg, and a temperature of 100° C.–160° C. For carrying out this step, a very small amount of steam or insert gas is generally sufficient.

It is preferred to perform the operations continuously, preferably in contact columns containing filling or contact materials, so as to diminish the contact time required.

The following description, made with reference to the accompanying drawing, is given of purposes of illustration, but not by way of limitation.

The drawing is a diagrammatic flow sheet of apparatus used in the practice of the invention.

For purposes of illustration of one complete manner of practicing the invention, the apparatus shown comprises three successive columns in which there is carried out, respectively, the stripping step at atmospheric pressure or under positive pressure (column 1), the stripping step under moderate vacuum (column 2), and the stripping step under high vacuum (column 3).

In accordance with the previous description, it is possible to make use of either the three columns together or only two of them in the following combination:

column 1 and column 2,
column 1 and column 3,
column 2 and column 3,
columns 1, 2 and 3.

In the modification wherein use is made of the three columns and which, for simplification of the disclosure will constitute the sole description, the raw ester containing excess alcohol and other impurities is introduced into column 1 through pipe 4. Steam under pressure is introduced into the bottom of the column 1 through pipe 5 to insure entrainment of alcohol in the heads, heating of column 1 and, after issuing from the column, making use of the steam to heat other items of the esterification plant. In fact, the greater part of the heat in the steam issuing through pipe 7 from the top of the column 1, when operated under pressure, can be usefully recovered as disclosed in the British Pat. No. 934,027 or U.S. Pat. No. 3,328,269. For this purpose, from the vapors issuing from the top of column 1 there is removed through pipe 6 the part thereof desired for operating the plant while the remainder of the vapors, if any, are removed through pipe 7 to a condenser (not shown) which extracts the excess heat supplied to column 1. Such an arrangement avoids the fluctuations of the plant where such fluctuations lead to the supply of column 1 with somewhat more heat than it is thereafter necessary to recover.

Generally, however, it is advisable to select the operating pressure in column 1 so that the alcohol is removed from the ester under the most economical conditions. In such instance, the expenditure of heat is limited so that substantially all of the heat introduced through pipe 5 will be recovered and utilized for heating other steps in the production of the ester.

Even if the alcohol removal in column 1 is incomplete, it is nevertheless substantially free, insofar as the expenditures of heat is concerned, since the amount of heat supplied thereto, and which can be practically entirely recovered, is necessary for the operation of other items of the plant.

Moreover, it is possible to take advantage of the fact that distillation under pressure is preferably employed in column 1 to effect an introduction of water into the top part of the column through pipe 8 so as to perform a water washing of the ester at relatively high temperature. This is favorable to the removal of the last traces of salts resulting from the neutralization of the free acidity with the result that the esters so treated have improved resistivity.

The still impure ester, together with the water introduced through pipe 8, if any, and the water resulting from condensation of the steam, are drawn off from the base of the column 1 through pipe 9. The water may be separated from the ester in a decanter 10 with the water being removed through pipe 11 while the ester is withdrawn through pipe 12 for introduction into column 2, after passing through a heater 13 and a release valve 14.

Superheated steam is introduced into the base of column 2 through a pipe 15. Column 2 is preferably heat insulated and may be provided with a heating jacket 16. If a heating jacket is not employed, the column may contain one or more devices for grouping or channelling the liquid streams with heating coils being placed in such devices. The ester introduced into the upper part of column 2 is preferably preheated by heater 13 to a temperature higher by some degrees (° C.) than the operating temperature prevailing in the upper part of column 2. This is to compensate for the heat loss due to the vaporization of the alcohol to be removed, especially when there is no provision for grouping of the liquid streams provided with heating devices.

The superheated gaseous fluid introduced into column 2 through pipe 15 is preferably steam obtained by adiabatic release of saturated steam at a convenient pressure, preferably 5 to 12 bars, in order that its temperature is at least equal to the operating temperature selected. The steam feed rate through pipe 15 is preferably within the range of 0.5 to 15 cubic meters (calculated with reference to the temperature and pressure conditions used) per kg. of ester treated, calculated as the pure ester. It varies according to the kind of ester treated and the kind and proportion of alcohol and other impurities to be removed. In actual practice, the steam feed rate corresponds to a weight of steam of 20 to 400 grams per kg. of ester treated, calculated as pure ester.

The vapors issuing from the top of column 2 are led through pipe 17 to a condenser 18 in which both the entrained alcohol and water vapor, if any (in the preferred case where the column is fed at its base with steam and not with a vehicle gas), are liquefied. In this instance, it is easy to maintain the vacuum by suction through pipe 19 since there is little, if any, gas to be removed. In actual practice, the only gas present is air which may enter the apparatus through leakage. If the alcohol is only one that is sparingly miscible with water, it is separated therefrom in a decanter 20. The alcohol, which is found in the upper layer in the decantation, is withdrawn through pipe 21 and the aqueous lower layer is withdrawn through pipe 22. If, on the contrary, the liquid mixture of water and alcohol is homogeneous, it is advanced from the condenser 18 to a unit (not shown) in which the alcohol is recovered as by extraction and/or distillation, using conventional techniques.

Under the specified temperature and pressure conditions, substantially no hydrolysis of the ester occurs in column 2 and the water content of the ester issuing from the base of the column is already compartively low, such as of the order of 0.03% by weight or less, so that a final drying of the ester in column 3 is not always necessary, especially if the purity of the ester need not be very high.

To further purify the partially purified ester issuing through the base of column 2 through pipe 24, the ester is introduced into column 3 after passing through a heater or heat exchanger 25 and a release valve 26. Superheated steam or a hot inert gas is introduced into the base of column 3 through pipe 27. Desirably, column 3, as with column 2, is heat insulated or provided with a heating jacket 28 or else contains one or more zones which group the liquid streams and are provided with heating devices.

The gaseous fluid introduced through pipe 27 is preferably heated to at least the operating temperature selected. The feed rate thereof per kg. of ester treated, calculated as pure ester, is preferably in the range of 0.5 to 10 cubic meters, calculated under the temperature and pressure conditions existing. Calculated as steam, such feed rates correspond to a very low expenditure of steam, of the order of 2 to 30 grams of steam per kg. of ester treated, calculated as pure ester. After treatment in column 3, the water content of the ester issuing through pipe 29 is very low, equal to or below 0.008% by weight. If an inert gas is employed as a vehicle fluid instead of steam, it is possible further to reduce the water content of the ester to below 0.002% by weight. As a vehicle gas in column 3 and/or possibly in column 2, use can be made of the surrounding air. However, it may be desirable to use an oxygen-free gas such as nitrogen or hydrogen. Such is the case, particularly, when the entrainment of the alcohol and impurities requires the use of temperatures at which the ester undergoing treatment is noticeably oxidized or peroxidized.

Generally it is not necessary to provide a condenser at the top of column 3 since the removal of traces of distillate and vehicle fluid will be achieved directly in the suction pipe through an exit pipe 30.

As described, the operation which makes use of three columns represents the most complete mode of the practice of the process of this invention but it is possible to use only two of the three columns, the various combinations being as follows:

(I) COLUMN 2+COLUMN 3, WITHOUT COLUMN 1

In this case the raw ester to be treated is delivered to column 2 through pipe 12. Column 2 removes the excess alcohol and part of the other impurities. Column 3 removes the remainder of the low boiling impurities, deodorizes the ester and makes it anhydrous. This technique may be used rather generally and more particularly in the instances where the operation under pressure or at atmospheric pressure in column 1 removes little of the excesss alcohol. Such is the case, for example, with higher alcohol esters such as didecyl phthalates, ditridecyl phthalates or else tetrahydrofurfuryl esters.

(II) COLUMN 1+COLUMN 3, WITHOUT COLUMN 2

In this case the partially purified ester issuing from the decanter 10 through pipe 12 is introduced into column 3 through pipe 24. Column 1, operating under positive pressure removes the alcohol and part of the other impurities and column 3 purifies the ester and makes it anhydrous. This technique is preferably used for treating esters which have a boiling point below the boiling point range of the esters specified in connection with case (I) above and should be deodorized and dried. It is possible to treat in this way di-n-butyl phthalate or straight or branched-chain dihexyl or dioctyl phthalates.

(III) COLUMN 1+COLUMN 2, WITHOUT COLUMN 3

In this case column 1 removes part, which may be as much as almost all, of the alcohol, and column 2 removes the remainder of the alcohol and part of the other impurities and water. This technique is preferably used in the preparation of esters of lesser quality than desired in cases (I) and (II), that is, esters for which complete removal of impurities and complete drying is not required. This technique may be employed in the treatment of dioctyl or didecyl phthalates for which highly marked dielectric properties are not needed.

The following examples will illustrate the various ways of carrying out the process of this invention:

EXAMPLE 1

In a commercial scale apparatus comprising only column 1 and column 2, treatment is effected of didecyl phthalate mixed with 12.2% of its weight of decanol. In the first place, this impure ester is subjected to steam stripping in column 1 filled with Raschig rings and operated under an effective pressure of 2 kg./cm.$^2$ and in accordance with the process described in British Pat. No. 934,027 or U.S. Pat. No. 3,328,269. The partially purified ester which is advanced to column 2 through pipe 12 contains only 6% by weight decanol.

Column 2, filled with Raschig rings, is well heat insulated and maintained under an absolute pressure of 40 mm. Hg measured at the level of condenser 18. A mixture of 1730 kg. of didecyl phthalate, 104 kg. of decanol and 10 kg. of water per hour is introduced into column 2 through pipe 12 near the top of the column. This still impure ester has an acidity of 0.16 millimole per kg. and its color, measured after filtration through filter paper to separate the dispersed water, is about 30 APHA. Before being introduced into column 2, the mixture issuing from the base of column 1 at a temperature of 105° C. is heated to about 160° C. by heater 13.

Column 2 is fed at its base with 340 kg. per hour of steam superheated to 177° C. From decanter 20, at a temperature of 25° C., there is withdrawn from the upper portion 106 kg. per hour containing 97.5% of decanol, about 2.3% by weight of water and about 0.2% by weight didecyl phthalate. There is also withdrawn from the lower portion 334 kg. per hour consisting of water with traces of decanol and didecyl phthalate.

1730 kg. per hour of purified didecyl phthalate is withdrawn from the base of column 2 through pipe 24 at a temperature of 145°–150° C. The purified ester withdrawn contains less than 1 millimole of decanol per kg. which corresponds to less than 0.016% by weight and less than 0.24 gram of water per kg. corresponding to 0.024% by weight. The acidity of the ester is 0.18 millimole per kg. and its color is below 35 APHA.

The total amount of steam expended amounts to about 120 kg. per hour in heater 13 and 340 kg. per hour introduced through pipe 15 into column 2. This corresponds to a total of 0.266 kg. of heating steam per kg. of phthalate product.

It should be emphasized that the amount of heating steam introduced into the column 1 should not be taken into account because, as explained above and in the cited patents, this column is operated under pressure so that it becomes possible to recover substantially all of the useful heat supplied at its base and issued with the steam from its head to heat other items of the plant which would require the same amount of heat.

EXAMPLE 2

In a laboratory scale apparatus using only columns 2 and 3, both of which are filled with Raschig rings, there is treated raw diethyl hexyl phthalate mixed with 11.25% of its weight with 2-ethyl hexanol. Air is passed through the jacket 16 or use can be made of another heat exchange fluid at a temperature of 128°–130° C. Column 2 is maintained under an absolute pressure of 50 mm. of Hg measured at the level of the condenser 18, and is fed through pipe 12 with a mixture of 4000 grams of di-2-ethyl hexyl phthalate, 450 grams of 2-ethyl hexanol and 40 grams of water per hour with the mixture heated to 130° C. by heater 13. The raw ester has an acidity of 0.08 millimole per kg. and its color, measured after summarily drying to avoid turbidity, is 40 APHA. Chromatographic analysis gives the following impurities, the proportions of which are expressed in percent by weight of di-2-ethyl hexyl phthalate:

| | |
|---|---|
| 2-ethylhexyl butyrate | 0.070 |
| Di-2-ethyl hexyl ether | 0.052 |
| 2-ethyl hexyl benzoate | 0.085 |

Column 2 is fed at its base with 320 grams per hour of steam superheated to 137° C.±2° C. From decanter 20, at a temperature of 28° C., 463 grams per hour is withdrawn from the upper layer of the following composition given in percent by weight:

| | |
|---|---|
| 2-ethyl hexanol | 96.46 |
| Water | 2.6 |
| Di-2-ethyl hexyl phthalate | 0.1 |
| 2-ethyl hexyl butyrate | 0.43 |
| Di-2-ethyl hexyl ether | 0.28 |
| 2-ethyl hexyl benzoate | 0.13 | and 330 grams per hour of aqueous layer containing traces of 2-ethyl hexanol is withdrawn from the bottom. In arresting devices (not shown), inserted in pipe 19 and cooled to a low temperature of the order of −80° C., 18 grams per hour of condensate is obtained in the form of a mixture formed mainly of about 17 grams of water and 1 gram of 2-ethyl hexanol.

From the base of column 2 there is withdrawn through pipe 24 a partially purified ester having the following composition, in percent by weight:

| | |
|---|---|
| Di-2-ethyl hexyl phthalate  About | 99.8 |
| Water | 0.024 |
| 2-ethyl hexanol | 0.06 |
| 2-ethyl hexyl butyrate | 0.02 |
| Di-2-ethyl hexyl ether | 0.02 |
| 2-ethyl hexyl benzoate | 0.06 |

The ester contains 0.09 millimole of acidity per kg. and has a color of 45 APHA.

The partially purified ester is introduced into column 3 which is heat insulated by jacket 28 through which air is passed heated to a temperature of 130° C.±2° C. Column 3 is maintained under an absolute pressure of 5 mm. Hg measured at the top. The ester (about 4000 grams per hour) is introduced through pipe 24 after being heated at 130° C. in heater 25 to compensate for the heat loss through radiation in pipe 24.

Column 3 is fed at its base with 60 grams per hour of steam superheated to 130° C. There is withdrawn through pipe 29 at the base, 3993 grams per hour of di-2-ethyl hexyl phthalate which contains by weight:

| | Percent |
|---|---|
| 2-ethyl hexanol | 0 |
| Water About | 0.007 |
| 2-ethyl hexyl butyrate | 0 |
| Di-2-ethyl hexyl ether | 0.001 |
| 2-ethyl hexyl benzoate | 0.035 |

Its acidity is still 0.09 millimole per kg. and its color 45 APHA.

The total steam expended in the two columns, including the auxiliary heating devices for the feeds and the heating jackets, is about 0.3 kg. per kg. of di-2-ethyl hexyl phthalate.

EXAMPLE 3

In the apparatus of Example 2, there is treated raw di-2-ethyl hexyl sebacate mixed with 11.25% of its weight of 2-ethyl hexanol and 1.25% of its weight of water. Column 2, which is maintained under an absolute pressure of 45 mm. Hg, measured at the level of the condenser 18, is fed with 4.5 kg. per hour of the above mixture preheated to 120° C. Column 2 is fed at its base with 450 grams per hour of steam superheated to 120° C.

The substantially de-alcoholized sebacate withdrawn through pipe 24 is subjected to water determination and chromatographic analysis and gives the following composition by weight, with the substances listed in chromatographic order:

| | Percent |
|---|---|
| 2-ethyl hexanol | 0.06 |
| Water | 0.03 |
| Low boiling impurities | 0.02 |
| 2-ethyl hexyl butyrate | 0.025 |
| Di-2-ethyl hexyl ether | 0.015 |
| Middle boiling impurities | 0.09 |
| Di-2-ethyl hexyl azelate | 0.06 |
| Di-2-ethyl hexyl sebacate | 98.3 |
| 2-ethyl hexyl undecanoate | 0.6 |
| 2-ethyl hexyl dodecanoate | 0.8 |

The acidity of this mixture is 0.8 millimole per liter and its color is 40 APHA.

The substantially de-alcoholized sebacate, preheated to 125° C., is introduced into column 3 maintained under an absolute pressure of 5 mm. Hg, measured at the top. Air at a temperature of 125°±2° C. is passed through jacket 28.

Column 3 is fed at its base with 80 liters per hour (measured at 20° C. under a pressure of 760 mm. Hg) of nitrogen, heated to about 125° C.

There is withdrawn through pipe 29, 3996 grams per hour of purified sebacate having the following composition by weight, with the component listed in chromatographic order:

| | Percent |
|---|---|
| 2-ethyl hexanol | 0.005 |
| Water | 0.001 |
| Low boiling impurities | 0 |
| 2-ethyl hexyl butyrate | 0 |
| Di-2-ethyl hexyl ether | 0.002 |
| Middle boiling impurities | 0.082 |
| Di-2-ethyl hexyl azelate | 0.06 |
| Di-2-ethyl hexyl sebacate | 98.45 |
| 2-ethyl hexyl undecanoate | 0.6 |
| 2-ethyl hexyl dodecanoate | 0.8 |

The acidity of this mixture is 0.9 millimole per liter and its color is still 40 APHA.

EXAMPLE 4

In the apparatus of Example 2 treatment is made of raw di-tridecyl phthalate having the following composition in percent by weight:

| | |
|---|---|
| Di-tridecyl phthalate | 87.26 |
| Tridecanol | 12 |
| Water | 0.5 |
| Tridecyl benzoate | 0.1 |
| Impurities (various) | 0.14 |

The acidity of this mixture is 0.06 millmole per liter.

A heat exchange fluid at a temperature of 151°±2° C. is passed through jacket 16. Column 2, which is maintained under an absolute pressure of 50 mm. Hg, measured at the level of condenser 18, is fed with 2.6 kg. per hour of the above mixture preheated to 145° C. by heater 13. At its base, the column is fed with 600 grams per hour of steam superheated to 150° C.±2° C.

From decanter 20, at a temperature of 26° C., there is withdrawn 310.5 grams per hour of upper layer having the following composition in percent by weight:

| | | |
|---|---|---|
| Tridecanol | About | 98.3 |
| Water | About | 1.59 |
| Tridecyl benzoate | | 0.0065 |
| Impurities (various) | | 0.0032 |
| Di-tridecyl phthalate | | 0.1 | and 601.4 grams per hour of aqueous layer containing traces of tridecanol.

The partially de-alcoholized phthalate which is withdrawn through pipe 24 has the following composition, in percent by weight:

| | |
|---|---|
| Di-tridecyl phthalate | 99.4 |
| Tridecanol | 0.300 |
| Water | 0.028 |
| Tridecyl benzoate | 0.113 |
| Impurities (various) | 0.159 |

The partially de-alcoholized phthalate (about 2282 grams per hour) is heated to 140° C. and introduced into column 3 which is heated by a heat exchange fluid passed through the jacket 28 at a temperature of 145° C.±2° C. This column 3 is provided with a condenser followed by a separator, both of which are inserted in pipe 30 but not shown in the drawing. This column is maintained under an absolute pressure of 5 mm. Hg., measured at the exit from the condenser, and is fed at its base with 65 grams per hour of stream superheated to 145° C.

At the exit from the separator, at 26° C., there is collected 5.64 grams per hour of condensate having the following composition in percent by weight:

| | |
|---|---|
| Tridecanol | 73 |
| Water | 1.6 |
| Tridecyl benzoate | 9.4 |
| Impurities (various) | 8 |
| Di-tridecyl phthalate | 8 |

Substantially all of the steam fed to the base of the column is removed in uncondensed state by the suction pipe.

There is withdrawn through pipe 29 about 2274 grams per hour of purified phthalate having the following composition in percent by weight:

| | |
|---|---|
| Di-tridecyl phthalate | 99.74 |
| Tridecanol | 0.023 |
| Water | 0.007 |
| Tridecyl benzoate | 0.090 |
| Impurities (various) | 0.14 |

The acidity of this product is 0.08 millimole per liter.

EXAMPLE 5

In an apparatus comprising column 1, operated under positive pressure, and columns 2 and 3 of Example 2, treatment is made of raw di-2-ethyl hexyl phthalate mixed with 11.25% of its weight of 2-ethyl hexanol and 1% of its weight of water. Chromatographic analysis shows that this mixture also contains the following impurities, the proportions of which are expressed in percent by weight of di-2-ethyl hexyl phthalate:

| | |
|---|---|
| 2-ethyl hexyl butyrate | 0.070 |
| Di-2-ethyl hexyl ether | 0.052 |
| 2-ethyl hexyl benzoate | 0.085 |

4503 grams per hour of the above mixture is introduced into column 1 which is operated in accordance with the process described in the aforementioned British and U.S. patents, under an effective pressure of 2 kg./cm.$^2$ and at a temperature of 130° C.

The amount of steam introduced into this column is calculated to be just sufficient to make it possible, by recovery of the heat from the top of the column, to heat the esterification apparatus on the one hand and the water entrainer separation and rectification unit on the other hand. The steam expanded for all of this amounts to 1.5 kg. per kg. of pure di-2-ethyl hexyl phthalate eventually produced.

The partially de-alcoholized phthalate (4060 grams per hour) withdrawn through pipe 12 is subjected to water determination and chromatographic analysis and has the following composition in percent by weight:

| | |
|---|---|
| Di-2-ethyl hexyl phthalate | 98.53 |
| 2-ethyl hexanol | 0.39 |
| Water | 0.90 |
| 2-ethyl hexyl butyrate | 0.06 |
| Di-2-ethyl hexyl ether | 0.04 |
| 2-ethyl hexyl benzoate | 0.08 |

This partially de-alcoholized phthalate is heated to 125° C. and then introduced into column 2 having a jacket 16 heated to 129° C.±1° C. by the circulation of a heat exchange fluid therethrough. Column 2 is maintained under an absolute pressure of 50 mm. Hg and is fed at its base with 160 grams per hour of steam superheated to 135° C.

From decanter 20, at a temperature of 28° C., there is withdrawn 17.36 grams per hour of upper layer having the following composition in percent by weight:

| | |
|---|---|
| 2-ethyl hexanol | 76.2 |
| Water | 2.52 |
| 2-ethyl hexyl butyrate | 9.36 |
| Di-2-ethyl hexyl ether | 4.72 |
| 2-ethyl hexyl benzoate | 4.9 |
| Di-2-ethyl hexyl phthalate | 2.3 | and 185.1 grams per hour of aqueous layer containing water and traces of 2-ethyl hexanol.

The partially purified phthalate (about 4007 grams per hour) withdrawn through pipe 24, has the following composition in percent by weight:

| | | |
|---|---|---|
| Di-2-ethyl hexyl phthalate | | 99.824 |
| 2-ethyl hexanol | | 0.052 |
| Water | | 0.024 |
| 2-ethyl hexyl butyrate | About | 0.02 |
| Di-2-ethyl hexyl ether | About | 0.02 |
| 2-ethyl hexyl benzoate | About | 0.06 |

This partially purified phthalate is then treated in column 3 which is operated exactly in the manner described in Example 2, with the same steam utilization.

From pipe 29 there is collected 4001 grams per hour of final purified phthalate having the following composition in percent by weight:

| | |
|---|---|
| Di-2-ethyl hexyl phthalate | 99.957 |
| 2-ethyl hexanol | 0 |
| Water | 0.007 |
| 2-ethyl hexyl butyrate | 0 |
| Di-2-ethyl hexyl ether | 0.001 |
| 2-ethyl hexyl benzoate | 0.035 |

The balance of the steam utilization is as follows:

Column 1: The steam expenditure is substantially zero since the heat employed in column 1 is, in any event, supplied to the ester production plant for heating the esterification apparatus and the water entrainer recovery unit.

Column 2: 0.47 kg. per hour which includes the heating of the feed and the heating jacket 16.

Column 3: 0.22 kg. per hour which includes heating the feed and the heat supplied to the jacket 28.

Thus the total expenditure of steam corresponds to 0.69 kg. per hour or about 0.172 kg. of steam per kg. of final phthalate obtained.

By comparison with the operation of Example 2, it will be apparent that the use of column 1 in addition to columns 2 and 3 provides for the same removal of excess alcohol and other impurities with a reduction in steam utilization of about 0.13 kg. per kg. of final phthalate.

It will be apparent from the foregoing that we have provided a new and improved process and method which makes more efficient utilization of heat in the purification of high boiling esters and it will be understood that changes may be made in the details of construction, arrangement and conditions of operation, without departing from the spirit of the invention, especially as defined in the following claims.

We claim:

1. In the purification of high boiling esters produced by esterification of an acid or its anhydride with an excess of an alcohol of 4–13 carbon atoms to produce a reaction product containing the ester and free alcohol, the steps of subjecting the reaction product to separate but successive stripping steps for removal of free alcohol from the ester consisting of a final stripping step of stripping the reaction product with steam or inert gas at an absolute pressure within the range of 2–20 mm. of mercury and at a temperature within the range of 100–160° C., preceding the final stripping step with at least one other stripping step selected of an initial stripping of the reaction product with steam under an effective pressure within the range of 0.5 to 8 kg./cm.$^2$ and a temperature within the range of 110–175° C., and an intermediate stripping with steam or an inert gas at a pressure within the range of 30–300 mm. of mercury and a temperature within the range of 80–180° C.

2. The proces as claimed in claim 1 in which the initial stripping step is carried out at a pressure of 1 to 4 kg./cm.$^2$ and at a temperature within the range of 120–140° C.

3. The process as claimed in claim 1 in which the acid or anhydride is selected from the group consisting of an aliphatic diacid or its anhydride and an aromatic diacid or its anhydride.

4. The process as claimed in claim 1 in which the acid or anhydride is selected from the group consisting of phthalic acid, adipic acid, sebacic acid, azelaic acid, and their corersponding anhydrides.

5. The process as claimed in claim 1 in which the alcohol is selected from the group consisting of a primary alcohol, a secondary alcohol, a monohydric aliphatic alcohol, a cycloaliphatic monohydric alcohol, an araliphatic alcohol and a heterocyclic alcohol.

6. The process as claimed in claim 1 in which the successive stripping steps are carried out as a continuous operation.

7. The process as claimed in claim 1 in which the stripping steps are carried out by passing the raw ester with the stripping steam or gas through packed columns.

8. The process as claimed in claim 1 in which the inert gas is a heated gas selected from the group consisting of nitrogen, hydrogen and air.

9. The process as claimed in claim 1 in which the initial stripping step is carried out with steam at at least atmospheric pressure and in which the second stripping step is carried out at a vacuum within the range of 2 to 20 mm. of mercury.

10. The process as claimed in claim 9 in which the initial stripping step is carried out at a pressure within the range of 0.5 to 8 kg./cm.$^2$.

11. The process as claimed in claim 9 in which the initial stripping step is carried out at a pressure within the range of 0.5 to 8 kg./cm.$^2$ and at a temperature within the range of 110°–175° C.

12. The process as claimed in claim 9 in which the initial stripping step is carried out at a pressure within the range of 1 to 4 kg./cm.$^2$ and at a temperature within the range of 120°–140° C.

13. The process as claimed in claim 1 in which the intermediate stripping step is carried out at a temperature within the range of 110°–160° C.

14. The process as claimed in claim 1 in which the steam is superheated steam.

References Cited

UNITED STATES PATENTS

| | | |
|---|---|---|
| 1,905,974 | 4/1933 | Livingston. |
| 2,522,529 | 9/1950 | Miller et al. 203—49 |
| 2,666,707 | 1/1954 | Beu 203—49 |
| 2,674,570 | 4/1954 | Potts 203—79 |
| 2,778,849 | 1/1957 | Ackelsberg 260—475 |
| 3,328,269 | 6/1967 | Alheritiere 260—475 |

WILBUR L. BASCOMB, Primary Examiner

U.S. Cl. X.R.

203—79, 80; 260—475, 485, 499